United States Patent [19]

Murdock

[11] 4,257,895

[45] Mar. 24, 1981

[54] LOW GRAVITY CRUDE OIL AND WATER SEPARATOR

[76] Inventor: Forrest L. Murdock, P.O. Box 9635, Tulsa, Okla. 74107

[21] Appl. No.: 37,155

[22] Filed: May 8, 1979

[51] Int. Cl.³ .............................................. B01D 17/06
[52] U.S. Cl. ..................... 210/243; 210/521; 210/DIG. 5; 210/532.1; 55/174; 55/206
[58] Field of Search ............... 210/243, 416 L, 513, 210/521, 522, 532 R, DIG. 5; 55/174, 206; 204/304, 306, 308; 208/187

[56] References Cited

U.S. PATENT DOCUMENTS 3,664,093  5/1972  Murdock, Sr. ..................... 55/174

FOREIGN PATENT DOCUMENTS 941887  11/1963  United Kingdom ................. 210/243

*Primary Examiner*—S. Leon Bashore
*Assistant Examiner*—Ferris H. Lander
*Attorney, Agent, or Firm*—Head & Johnson

[57] ABSTRACT

An apparatus for separating oil and water from an emulsion including a horizontal vessel having an emulsion inlet at the inlet end and an upper oil outlet and a lower water at the discharge end. Baffles within the vessel cause the emulsion to flow vertically through an electric grid system, subjecting the emulsion to an electric field, and a plurality of spaced apart paralleled separator screens between the baffles and the discharge end of the vessels, each separator screen being a planar foraminous reticulum of integrally formed small width and small thickness strands of which are longitudinally downwardly inclined which carry separated water to the bottom of the vessel.

8 Claims, 4 Drawing Figures

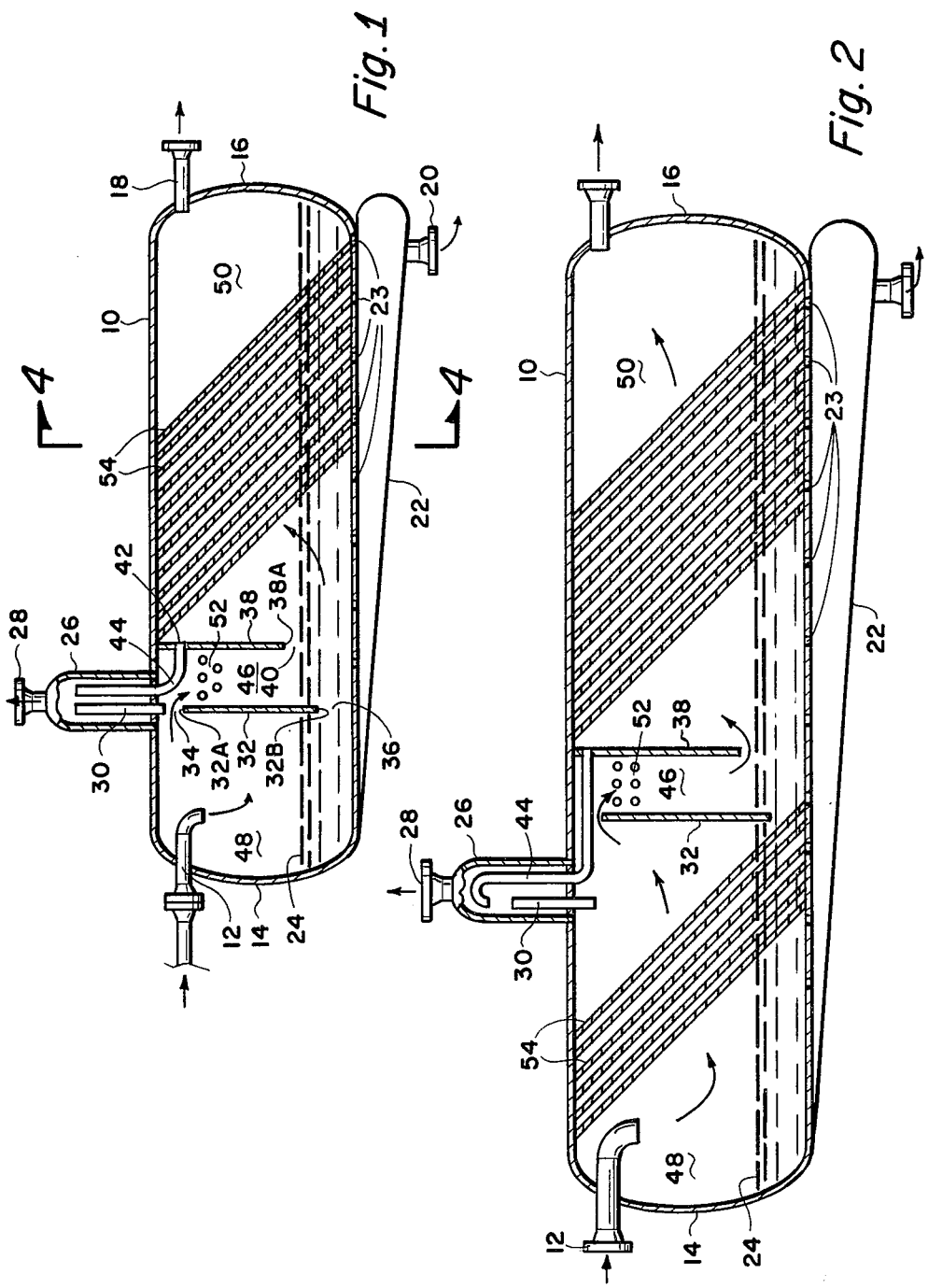

LOW GRAVITY CRUDE OIL AND WATER SEPARATOR

BACKGROUND AND OBJECTS OF THE INVENTION

In the petroleum industry, much of the crude oil produced is co-mingled with water and gas. It is therefore necessary to provide some means of efficiently and economically separating the oil, water, and gas for separate discharge. Usually the separated water is pumped back into a subterranean formation, and the separated crude oil is conducted to a pipeline for ultimate transportation to a refinery. Separated gas is vented, if in small quantities: if in commercial quantities, it is collected for distribution by a pipeline.

With the rising value of petroleum products, it becomes increasingly important that separator equipment utilized by the petroleum industry extract the maximum possible recoverable petroleum products from a water and oil emulsion. To this end, practitioners have improved separating vessels substantially over the years. Initially, a separator was merely an open vessel providing a quiescent zone with the intention that the water settle out and be withdrawn from the bottom of the vessel and the petroleum float on the water and be withdrawn from the top of the vessel. While this system works satisfactorily to a degree, it nevertheless results in some oil remaining in the form of an emulsion with the withdrawn water and, in like manner, water being entrapped with the oil withdrawn from the top of the vessel. Further, such gravitational settling procedures are slow and to provide vessels of sufficient volume to allow separation by gravitation alone becomes exceedingly expensive, and the reduced rate of low results in overall inefficiencies.

The present invention is directed towards an apparatus for separating oil and water from an emulsion which has as its basic object improved efficiency and effectiveness in separating oil, gas and water from an emulsion.

Thus, it can be said that the primary object of this invention is an improved oil, gas, and water separator. More particularly, an object of this invention is to provide a horizontal separator vessel for separating oil, gas, and water from an emulsion wherein the vessel includes means for subjecting the emulsion to an electric field to enhance the effectiveness of separation and in a manner wherein the fluid flows in a vertical direction as it passes through the electric field.

A still more particular object of this invention is to provide an apparatus for separating oil, water, and gas from an emulsion comprising a horizontal separating vessel including means for passing the emulsion vertically through an electric field and, subsequently, passing the emulsion through a plurality of spaced apart parallel separator screens, each of the screens being of a planar foraminous reticulum of integrally formed relatively small width and small thickness strands, all of which are longitudinally downwardly inclined providing a multiplicity of continuous uninterrupted downwardly inclined paths on which water components from the emulsion may travel towards the bottom of the vessel for discharge.

These general objects as well as other and more specific objects of the invention will be fulfilled in the following description and claims, taken in conjunction with the attached drawings.

DESCRIPTION OF VIEWS

FIG. 1 is a cross-sectional view of a horizontal vessel for separating oil, gas, and water from an emulsion, the emulsion flowing into the vessel at one end, the gas being extracted from an upper intermediate position, water being extracted from the lower end opposite the inlet end, and oil being extracted from the upper opposite end of the vessel.

FIG. 2 is a cross-sectional view of an alternate design of the arrangement of FIG. 1 also showing the vessel in horizontal cross-sectional view and showing the arrangement wherein the emulsion is subjected to two separating zones—one before the emulsion is subjected to an electrical field, and the other after subjection to the electric field.

SUMMARY OF THE INVENTION

Figure 3:
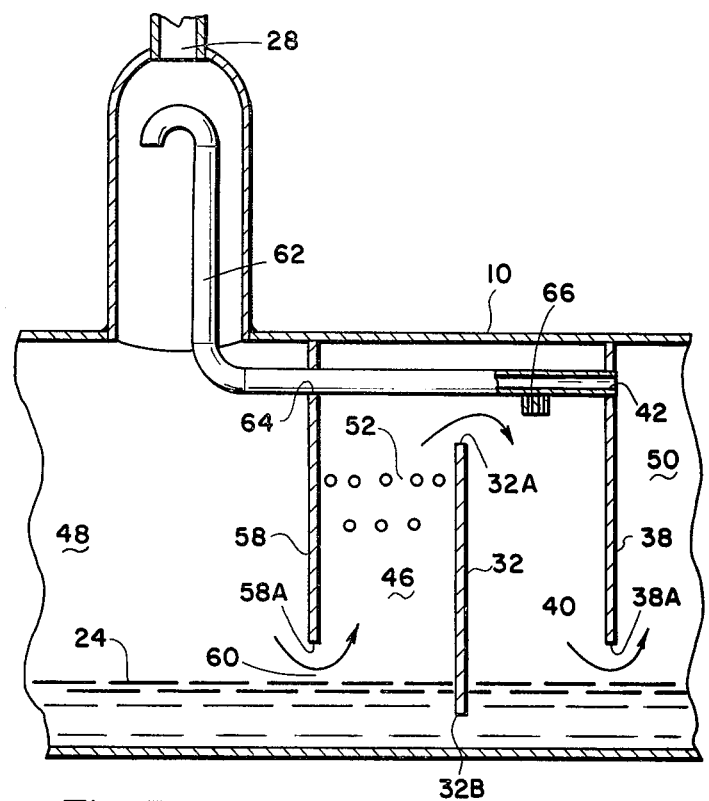
FIG. 3 is a fragmentary cross-sectional view showing a baffle arrangement which may be employed when it is desired to subject the emulsion to an electric field as the emulsion travels vertically upwardly in the vessel.

An apparatus is provided for separating oil, gas, and water from an emulsion, such as encountered in the production of crude oil. A horizontal vessel is utilized having an emulsion line at the first end. At the second end is an upper oil outlet and a lower water outlet. Intermediate the ends is an upper gas outlet. The function of the vessel is to provide an environment such that the emulsion is separated into its oil, gas, and water components for independent withdrawal. The vessel includes means for maintaining water in the bottom at a preselected depth. In the vessel, and intermediate its ends, is a first vertical baffle and spaced from it a second vertical baffle arranged so that one of the baffles extends so that the lower end is below the water surface. This means that the emulsion flowing through the baffle must pass over the top of it and under the adjacent baffle so that thereby a fluid flows in a vertical direction as it passes between the baffles. Within this vertical area between the baffles is an electric grid system having spaced apart electrodes and including means of imparting an electrical potential to the electrodes, creating an electric field through which the emulsion passes. Following the passage through the emulsion field, there is a separating zone in which is positioned a plurality of spaced apart parallel separator screens. Each of the separator screens is a planar foraminous reticulum of integrally formed relatively small width and small thickness strands, all of which are longitudinally downwardly inclined and provide a multiplicity of continuous and un-interrupted downwardly inclined paths. Water droplets from the emulsion tend to cling to the separator screens and to travel downwardly on the continuous paths to enter the water level in the bottom of the vessel. Oil, having water separated therefrom, migrates upwardly towards the upper portion of the second end of the vessel where it is withdrawn. In this manner, the emulsion passes horizontally through the vessel but vertically through an electric field prior to passing through a separator section where the water is extracted from the emulsion to achieve improved efficiency and effectiveness of oil and water separation.

DETAILED DESCRIPTION

Referring to the drawings and first to FIG. 1, a horizontal separating vessel embodying the principles of this invention is shown in cross-section. A horizontal vessel 10 has an emulsion inlet 12 at the vessel first end 14. At the vessel second end 16 there is an upper oil outlet 18 and a lower water outlet 20. The vessel 10 is shown with a sand trap 22 affixed to the lower end which includes the water outlet 20. Opening 23 in the bottom of vessel 10 allows water and any sand carried by the water to enter said trap 22. The use of sand traps 22 in conjunction with separators is well known and, of and within itself, not a part of the innovative features of the present invention. The invention functions in the same way whether or not sand trap 22 is employed; and if the sand trap is not utilized, water outlet 20 connects directly with the vessel 10 at or adjacent to the second end 16.

Means is provided (not shown) for maintaining a level of water 24 within the vessel. The water level 24 is maintained by known techniques normally employing an interphase detector, such as a float which has a density sufficient to float on water, but not on oil, to thereby regulate the rate of discharge of the water through outlet 20 to maintain water level 24. The reason the apparatus for maintaining water level 24 is not disclosed is that it is a well-known technique in the industry and not related to the novel principles of the present invention.

The function of the vessel is to receive the emulsion through inlets 12 and to separate it so that the oil component passes out through oil outlet 14 and water through water oulet 20. Intermediate ends 14, 16 is an upright cylinder 26 having a gas outlet opening 28. Gas freed from the emulsion within vessel 10 rises into the cylinder 26 and is withdrawn through outlet 28. The cylinder 26 may either have open communication at the bottom thereof with the interior of the vessel 10, as shown in FIG. 3, or may include a pipe 30 open at the bottom and the top for communicating gas from the vessel into the interior of the cylinder 26.

A first vertical baffle 32 is supported within the interior of the vessel and extends across the full internal diameter of the vessel. The baffle is of a height less than that of the vessel providing an opening 34 above the top edge of the baffle. The lower edge 32B is below the water level 24 but above the bottom of the vessel providing a water passageway 36.

Spaced from the first baffle 32 in the direction toward the vessel second end 16 is a second baffle 38 which has closed communication with the interior of the vessel at the upper end, but the lower end 38A terminates above water level 24 providing a passageway 40. Baffle 38 is provided with an opening 42 at the upper end having communication with a pipe 44 which terminates within the cylinder 26. Gas escaping from the emulsion in the area between the second baffle 38 and the second end 16 can pass out through opening 42 and pipe 44 for discharge through gas outlet 26.

Baffles 32 and 38 are spaced apart from and parallel to each other and provide a passageway 46 therebetween. Emulsion flowing from inlet 12 enters the area of the interior of the vessel between first baffle 32 and first end 14. This area may be termed a quiescent zone 48. The area of the interior of the vessel between the second baffle 38 and second end 18 forms a separating zone 50.

Within the electric field zone 46 between baffles 32 and 38 are positioned an electric grid system 52 consisting of a plurality of spaced apart electrodes. The electrodes may typically be in the form of a series of rods, one set being in a horizontal plane above the other set. One set of the rods is grounded to the walls of vessel 10 while the other set is insulated from the walls of the vessel. An electric potential is applied between the two sets of grids creating an electric field between them. For reference to information describing one means of providing an electric grid system, reference may be had to U.S. Pat. No. 3,441,496. An electrical potential is applied between the grid creating an electric field to which the emulsion passes as it flows downwardly in the electric field zone 46 and between baffles 32 and 38. The function of the electric field is to cause droplets of oil which are carried by the emulsion to coalesce; that is, merge together. A small droplet of oil has such high surface tension that the settling of the droplet out of an emulsion takes a considerable length of time, and any turbulence tends to keep the small droplet in suspension. However, as the size of the droplet grows, its buoyancy in proportion to surface tension increases, and after the droplet becomes of sufficient size, it more easily moves within the emulsion to rise to the top. The electric grid system 52 causes small droplets to cling to each other to form larger droplets or globules which float above water level 24. This coalescing action enhances the efficiency and effectiveness of the treater in achieving more complete separation of water and oil.

Figure 4:
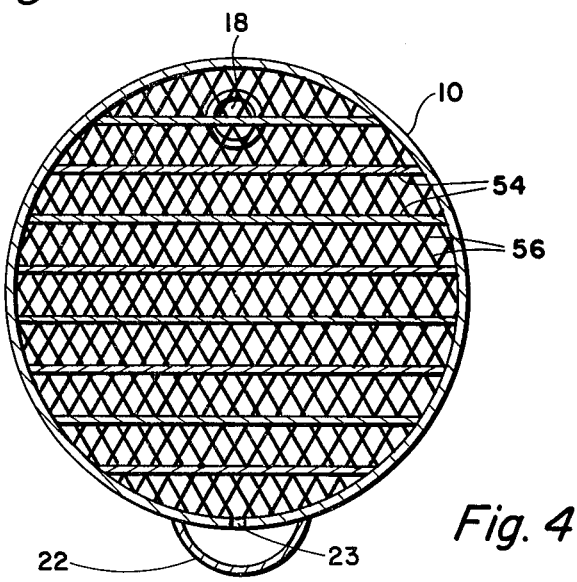
FIG. 4 is a cross-sectional view taken along the line 4—4 of FIG. 1 showing the arrangement of the separator screens.

After passing through the electric field in zone 46, the emulsion flows through passageway 40 under the lower edge of second baffle 32 into the separating zone 50. Within the separating zone there are a plurality of spaced apart parallel separator screens 54. Each separator screen 54 is continuous between the vessel upper and lower surface and completely across the interior width of each vessel, or, in other words, as shown in FIG. 4, each screen completely transcends the full interior of the vessel.

Emulsion flowing from the first end towards the second end of the vessel must pass through each of the paralleled separator screens 54. Each of these screens is a planar foraminous reticulum of integrally formed relatively small width and small thickness strands 56 (see FIG. 4). All of the strands 54 are longitudinally downwardly inclined and provide a multiplicity of continuous uninterrupted downwardly inclined paths on which water travels toward the bottom of the vessel for discharge out the water outlet 20. Screens 54 are of metal or other hydrophilic material so that water tends to attach to the strands—whereas, the oil component of the emulsion passing through separating zone 50 tends to pass between the strands and to flow upwardly for ultimate discharge.

Thus the vessel of FIG. 1 provides a first quiescent zone 48 in which the emulsion has an opportunity to separate by gravity. A substantial portion of the water settles out. Next the emulsion passes downwardly through an electrical field in zone 46. The heavier water components are thus directed downwardly as emulsion turns upwardly after passing through the passageway 40 beneath the lower end 38A of the second baffle. Finally the emulsion passes through the separating zone 50 wherein it is subjected to the multiplicity of parallel separator plates 54 where the final water component is directed downwardly and out of the emulsion. The oil component megrates upwardly for discharge through the oil outlet 18.

FIG. 2 shows an alternate arrangement which is different from the arrangement of FIG. 1 only in that the quiescent zone 48 is, like the separating zone of FIG. 1, provided with a multiplicity of parallel separator plates 54. The function of the separator plates 54 in the quiescent zone 48 is exactly the same as it is in the separating zone 50. The arrangement of FIG. 2 is preferred for emulsions that are difficult to separate. The use of plates 54 in the quiescent zone 48 allows a substantial degree of water removal to take place before the emulsion is passed through the electric field zone 46 to thereby reduce the amount of water in the emulsion passing through the electric zone for more effective utilization of the zone to cause the oil droplets to coalesce with each other.

FIG. 3 shows an arrangement including a third baffle 58 which is positioned in front of first baffle 32. The electric grid system 52 is positioned between the third baffle 58 and the first baffle 32. The lower edge 58A of the third baffle is spaced above water level 24 providing a passageway 60 for the flow of emulsion underneath. The advantage of the arrangement of FIG. 3 is to cause the emulsion to pass upwardly as it migrates through the electric grid system so that the electric field zone 46 is between the first baffle 32 and third baffle 58. In some instances, some emulsions achieve a greater response to the electric field if emulsion passes upwardly through the field rather than downwardly as in FIGS. 1 and 2.

In the arrangement of FIG. 3, a pipe 62, which corresponds with pipe 44 of FIGS. 1 and 2, extends through an opening 64 in third baffle 58 and is provided with a T fitting or opening 66 so that any gas escaping from the emulsion between the second baffle 38 and first baffle 58 is passed through pipe 42 for ultimate discharge through the gas outlet 28.

Using three baffles provides a system wherein the flow is directed downwardly and then back upwardly in two different places; that is, at a passageway 60 and passageway 40. Reversing the direction of flow from downward to upward has a tendency to cause increased separation since the heavier water component, once giving a downward direction of flow, tends to maintain this direction, whereas the lighter components, that is, oil, having less inertia, more easily changes direction and flows upwardly with the emulsion. Thus, the arrangement of FIG. 3 provides two such flow direction reversals which occur immediately above the water level 24, encouraging the water component of the emulsion to enter the water in the bottom of the vessel for ultimate discharge.

For a more detailed description of the means wherein the separator screens 54 function to increase the separation of water and oil and for a description of the types of separator screens which may be employed, reference may be had to U.S. Pat. No. 3,664,093.

The invention provides a greatly improved separator vessel for more effectively and efficiently separating oil, gas and water components from a crude oil emulsion. The separator has the advantage of being arranged in a horizontal orientation so that work on the vessel can be done without requiring workmen to scale at higher elevations while nevertheless most effectively utilizing the forces of gravity.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An apparatus for separating oil and water from an emulsion comprising:
    a horizontal vessel having an emulsion inlet adjacent the first end and an upper oil outlet and a lower water outlet adjacent the second end;
    means of maintaining a level of water of selected depth in the vessel;
    a first vertical baffle in the vessel intermediate the ends;
    a second vertical baffle in the vessel parallel to and spaced from the first baffle in the direction towards the vessel second end, the baffles being arranged so that emulsion flowing from the first towards the second end of the vessel flows vertically between the baffles, the area of the vessel between the first end and the first baffle forming a quiescent zone, and the areas of the vessel between the second baffle and the vessel second end forming a separating zone;
    an electric grid system traversing the areas between said baffles, the grid system including electric grids spaced in horizontal layers and arranged such that emulsion passing between said baffle passes vertically through successive horizontal layers of the grid system;
    means of imparting an electric potential to said grid system whereby an electric field is established through which emulsion flows as it passes from said quiescent zone to said treating zone;
    a plurality of spaced apart paralleled metal separator screens positioned within said vessel treating zone arranged such that fluid flowing through the treating section towards said oil outlet flows through said screens, each separator screen being a planar foraminous reticulum of integrally formed relatively small width and small thickness strands all of which are longitudinally downwardly inclined providing a multiplicity of continuous uninterrupted downwardly inclined paths on which water components may travel towards the bottom of the vessel for discharge out said water outlet.

2. A water-oil separator according to claim 1 including:
    a gas separator opening in the upper portion of said vessel intermediate the ends.

3. A water-oil separator according to claim 2 wherein said gas separator includes:
    an upright cylinder, the lower end of which communicates with an opening in the vessel upper portion intermediate the vessel ends, the cylinder having a gas outlet opening in the upper end.

4. A water-oil separator according to claim 3 wherein said opening in said vessel upper portion communicates with said vessel quiescent chamber and including:
    a gas conduit extending through said baffles, one end of the conduit communicating with the upper portion of said treating zone and the other end communicating with said upright cylinder upper portion whereby gas from said quiescent zone passes directly into said cylinder and gas from said treating zone passes through the conduit to said cylinder.

5. A water-oil separator according to claim 1 wherein said first baffle upper end is of a height less than the full interior height of the vessel providing a flow passageway thereabove and the lower end terminates above the vessel bottom but below said water level, and wherein said second baffle connects with the vessel upper interior and the lower end terminates above said water level providing a flow passageway below the second baffle lower end and said water level, whereby emulsion flowing through said vessel flows downwardly through the area between said baffles and thereby downwardly through said grid system.

6. A water-oil separator according to claim 1 wherein said first baffle connects with the vessel interior at the upper end thereof and the bottom terminates above said water level providing a flow passageway between the first baffle lower end and said water level and said second baffle upper end is of a height less than the interior height of the vessel providing a flow passageway thereabove, and the lower end is above the vessel bottom but below said water level, whereby emulsion flowing through the vessel flows upwardly between said first and second baffle and thereby the emulsion flows upwardly through said grid system.

7. A water-oil separator according to claim 6 including a third vertical baffle within said vessel positioned between said second baffle and said treating zone, said third baffle being parallel to and spaced from said second baffle and the upper end connecting with the vessel upper interior, the lower end of the third baffle terminating above said water level providing a flow passageway below the baffle bottom and the water level whereby emulsion flowing over the upper end of the second baffle flows downwardly in the area between said second and third baffles and beneath the third baffle into said treating zone.

8. A water-oil separator according to claim 1 including:

a plurality of spaced apart paralleled separator screens positioned within said vessel quiescent zone arranged such that fluid flowing through the treating section towards said oil outlet flows through said screens, each separator screen being a planar foraminous reticulum of integrally formed relatively small width and small thickness strands, all of which are longitudinally downwardly inclined providing a multiplicity of continuous uninterrupted downwardly inclined paths on which water components may travel towards the bottom of the vessel for discharge out said water outlet.

* * * * *